(12) United States Patent
Mao et al.

(10) Patent No.: US 8,883,669 B2
(45) Date of Patent: Nov. 11, 2014

(54) HYDROCRACKING CATALYST, A PROCESS FOR PRODUCING THE SAME, AND THE USE OF THE SAME

(75) Inventors: Yichao Mao, Beijing (CN); Hong Nie, Beijing (CN); Jianwei Dong, Beijing (CN); Zhenlin Xiong, Beijing (CN); Zhihai Hu, Beijing (CN); Yahua Shi, Beijing (CN); Dadong Li, Beijing (CN)

(73) Assignees: China Petroleum & Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 12 days.

(21) Appl. No.: 12/960,159

(22) Filed: Dec. 3, 2010

(65) Prior Publication Data
US 2011/0127192 A1  Jun. 2, 2011

Related U.S. Application Data

(63) Continuation-in-part of application No. 11/912,566, filed as application No. PCT/CN2006/000798 on Apr. 26, 2006, now abandoned.

(30) Foreign Application Priority Data

Apr. 29, 2005  (CN) .......................... 2005 1 0068173

(51) Int. Cl.
*B01J 29/072* (2006.01)
*B01J 31/04* (2006.01)
*B01J 31/02* (2006.01)
*B01J 21/12* (2006.01)
*C10G 47/12* (2006.01)
*C10G 47/20* (2006.01)
*B01J 23/85* (2006.01)
*C10G 47/16* (2006.01)
*B01J 29/48* (2006.01)
*C10G 2/00* (2006.01)
*B01J 37/02* (2006.01)
*B01J 23/888* (2006.01)
*B01J 35/10* (2006.01)
*B01J 29/076* (2006.01)
*B01J 29/16* (2006.01)
*B01J 37/00* (2006.01)

(52) U.S. Cl.
CPC .............. *B01J 23/85* (2013.01); *B01J 37/0009* (2013.01); *C10G 47/16* (2013.01); *B01J 21/12* (2013.01); *B01J 29/48* (2013.01); *B01J 31/0202* (2013.01); *C10G 47/12* (2013.01); *C10G 2/30* (2013.01); *B01J 37/0203* (2013.01); *B01J 23/888* (2013.01); *B01J 31/04* (2013.01); *B01J 35/1061* (2013.01); *B01J 37/0201* (2013.01); *B01J 29/076* (2013.01); *B01J 29/166* (2013.01); *B01J 31/0235* (2013.01); *B01J 31/0254* (2013.01); *C10G 47/20* (2013.01); *B01J 35/1066* (2013.01); *B01J 31/0237* (2013.01)
USPC ............... 502/66; 502/62; 502/150; 502/167; 502/254; 502/258; 208/111.3; 208/111.35

(58) Field of Classification Search
USPC ......... 502/66, 150, 167, 254, 258; 208/111.3, 208/111.35
See application file for complete search history.

(56) References Cited

U.S. PATENT DOCUMENTS

| | | | |
|---|---|---|---|
| 4,332,782 A * | 6/1982 | Scherzer et al. | 423/628 |
| 4,376,104 A | 3/1983 | Ball et al. | |
| 4,503,023 A | 3/1985 | Breck et al. | |
| 4,530,911 A | 7/1985 | Ryan et al. | |
| 5,030,780 A | 7/1991 | Ward et al. | |
| 5,187,133 A | 2/1993 | Yoshinari et al. | |
| 5,914,290 A * | 6/1999 | Shi et al. | 502/228 |
| 5,954,944 A * | 9/1999 | Zhang et al. | 208/89 |
| 2002/0008051 A1* | 1/2002 | Ishida et al. | 208/59 |
| 2002/0010086 A1* | 1/2002 | Plantenga et al. | 502/167 |
| 2003/0104926 A1 | 6/2003 | Eijsbouts et al. | |
| 2003/0173256 A1 | 9/2003 | Fujikawa et al. | |

(Continued)

FOREIGN PATENT DOCUMENTS

| | | |
|---|---|---|
| CN | 1037168 | 11/1989 |
| CN | 1175481 | 3/1998 |

(Continued)

OTHER PUBLICATIONS

Inova et al. "Real Structure of Metastable FOrms of Aluminum Oxide". Kinetics and Catalysis, vol. 41, No. 1, 2000, pp. 122-126.*

(Continued)

*Primary Examiner* — Renee E Robinson
(74) *Attorney, Agent, or Firm* — Novick, Kim & Lee, PPLC; Allen Xue

(57) ABSTRACT

The present invention relates to a hydrocracking catalyst comprising an acidic silica-alumina, an optional alumina, an effective quantity of at least one VIII Group metal component(s), an effective quantity of at least one VIB Group metal component(s) and an organic additive, wherein the organic additive is one or more selected from the group consisting of an oxygen-containing or nitrogen-containing organic compound, and the molar ratio of the organic additive to the VIII Group metal component(s) is 0.01-10. The present invention relates further to a process for producing the hydrocracking catalyst and use of the catalyst in a process for hydrocracking hydrocarbon oils. The hydrocracking catalyst provided according to the present invention shows a higher activity for aromatic hydrosaturating and ring-opening reaction, as compared with the prior art hydrocracking catalyst.

18 Claims, No Drawings

(56) References Cited

U.S. PATENT DOCUMENTS

| | | | |
|---|---|---|---|
| 2003/0178344 A1* | 9/2003 | Plantenga et al. | 208/217 |
| 2004/0055936 A1* | 3/2004 | Diehl et al. | 208/216 R |
| 2006/0054536 A1 | 3/2006 | Fujikawa et al. | |

FOREIGN PATENT DOCUMENTS

| | | |
|---|---|---|
| CN | 1054150 C | 6/1998 |
| CN | 1184843 | 6/1998 |
| CN | 1055961 C | 6/1999 |
| CN | 1400284 | 3/2003 |
| CN | 1356380 | 7/2003 |
| EP | 1145763 A1 | 10/2001 |
| GB | 2114594 | 8/1983 |
| JP | 53101003 | 9/1978 |
| TW | 177893 | 2/1992 |
| WO | 2004054712 | 7/2004 |

OTHER PUBLICATIONS

Office Action from the Canadian Intellectual Property Office for Application No. 2,592,332 dated Apr. 13, 2012 (3 pages).
Emeis, 1993, "Determination of Integrated Molar Extinction Coefficients for Infrared Absorption Bands of Pyridine Adsorbed on Solid Acid Cataysts", Journal of Catalysis 141: 347-354.
Lynch, 2002, "Development of structural characterization tools for catalysts", Oil and Gas Science Technology, 57(3): 281-305.
Chemical Engineer, Xiaogang Jing, Application of Organic Compound to the Development and Manufacture of Hydrofining Catalyst, Sum91 No. 4, Aug. 2002, pp. 29-30.
International Search Report, Apr. 13, 2004, from International Application No. PCT/JP03/16197.
International Search Report, Jul. 27, 2006, from International Application No. PCT/CN2006/000798.
International Search Report, Aug. 10, 2006, from International Application No. PCT/CN/2006/000799.
Supplementary European Search Report, Aug. 19, 2009, from European Patent Application No. 06722404.
Office Action from the Korean Patent Office for Application No. 10-2007-7015920 dated Sep. 14, 2012 (English Translation and Original, 8 pages).
Guido Busca, "The surface of transition aluminas: A critical review." Catalysis Today, 226 (2014), 2-13.
Carlo Perego et al., "Catalyst preparation methods." Catalysis Today, 34 (1997), 281-305.

\* cited by examiner

HYDROCRACKING CATALYST, A PROCESS FOR PRODUCING THE SAME, AND THE USE OF THE SAME

CROSS-REFERENCE TO RELATED APPLICATIONS

This is a continuation-in-part of U.S. patent application Ser. No. 11/912,566, filed Oct. 25, 2007, which application claims the benefit of International Patent Application No. PCT/CN2006/000798, filed Apr. 26, 2006, which claims the benefit of Chinese Patent Application No. 200510068173.8, filed Apr. 29, 2005. The entire contents of each of these applications are hereby incorporated by reference.

TECHNICAL FIELD

The present invention relates to a hydrocracking catalyst, a process for producing the same and use of the same.

BACKGROUND ARTS

A hydrocracking catalyst is a bifunctional catalyst, having simultaneously cracking activity and hydrogenation activity, i.e. containing simultaneously an acidic cracking component and a hydrogenation active component, wherein the acidic cracking component is generally selected from an acidic silica-alumina comprising a silica-alumina, a zeolite molecular sieve and a mixture thereof, while the hydrogenation active component is generally a metal selected from the group consisting of the VIB Group and VIII Group elements of the Periodic Table of Element, or an oxide and/or sulfide of the same. In order to meet with various requirements for the hydrocracked products, the acidic cracking component and the hydrogenation active component of the catalyst need to be modified as needed.

CN1054150C discloses a diesel oil hydrogenating conversion catalyst. The catalyst is composed of a carrier consisting of an alumina, an amorphous silica-alumina and a molecular sieve, and a hydrogenation-active metal supported on the carrier. The catalyst contains 10-30 wt % of $WO_3$, 2-15 wt % of NiO, 5-45 wt % of a molecular sieve, 30-70 wt % of alumina, 5-25% of an amorphous silica-alumina. Said molecular sieve is a Y-molecular sieve having an infrared total acidity of 0.5-1 mmol/g, and a lattice constant of 2.436-2.444 nm. Said alumina is a small pore alumina with a pore volume of 0.8-1.1 ml/g and a surface area of 230-400 $m^2/g$.

CN1184843A discloses a hydrogenating conversion catalyst for diesel oil, the catalyst has a composition of 40-80 wt % alumina, 0-20 wt % of an amorphous silica-alumina, 5-30 wt % of a molecular sieve, a VIB group metal content of 10-30 wt % and a V111 group metal oxide content of 2-15 wt %, wherein the molecular sieve is a Y-molecular sieve with a pore volume of 0.40-0.52 ml/g, a specific surface of 750-900 $m^2/g$, a lattice constant of 2.420-2.500 and a silica/alumina ratio of 7-15.

U.S. Pat. No. 5,030,780 discloses a process for saturating aromatic compounds, wherein a catalyst containing a hydrogenation metal supported on a carrier is used. Said carrier contains a zeolite and a porous heat-resistant inorganic oxide, especially a heat-resistant inorganic oxide made of dispersing a silica-alumina in an alumina matrix, wherein the zeolite comprises various known crystallo-silica-alumina zeolites that are natural or synthetic, such as faujasite, mordenite, erionite zeolite, Y-zeolite, X-zeolite, L-zeolite, Ω-zeolite, ZSM-4-zeolite, Beta-zeolite and the like.

CN1055961C discloses a hydrocracking catalyst suitable for producing a middle fraction oil, containing an amorphous silica-alumina component and a small pore alumina adhesive, at least one element of the VIB group and at least one element of the VIII group, wherein the content of the amorphous silica-alumina is 30-60 wt %, the total content of the hydrogenation metal oxides is 20-35 wt % and the balance is the small pore alumina adhesive, characterized in that the catalyst has a specific surface of 150-300 $m^2/g$, a pore volume of 0.25-0.50 ml/g, a distribution of the pore having a diameter of 4-15 nm in the range of 60-90% and an infrared acidity of 0.30-0.50 mmol/g.

CN1400284A discloses a catalyst for hydrotreating diesel oil. The catalyst contains a carrier, and molybdenum and/or tungsten and nickel and/or cobalt supported on the carrier, characterized in that the carrier is composed of alumina and a zeolite, with a weight-ratio of alumina to the zeolite in the range of 90:10-50:50, wherein the alumina is a complex of a small pore alumina and a large pore alumina in a weight-ratio of 75:25-50:50. The small pore alumina is one wherein the pore volume of the pore having a diameter less than 80 angstrom comprises more than 95% of the total pore volume, while the large pore alumina is one wherein the pore volume of the pore having a diameter of 60-600 angstrom comprises more than 70% of the total pore volume.

The hydrocracking catalysts provided according to the art can satisfy the requirements from some hydrocracking reactions, but a common problem shared by them is a lower conversion activity for aromatic hydrogenation.

DETAILED DESCRIPTION OF THE INVENTION

An object of the present invention is to overcome the disadvantage of the prior art hydrocracking catalyst that shows a low conversion activity for aromatic hydrogenation, and to provide a novel hydrocracking catalyst having a higher conversion activity for aromatic hydrogenation (abbreviated sometimes as the catalyst according to the present invention hereafter) and a process for producing the same. The present invention relates further to use of the hydrocracking catalyst for hydrocracking a hydrocarbon oil.

Therefore, the present invention provides firstly a hydrocracking catalyst comprising an acidic silica-alumina, an optional alumina, an effective quantity of at least one VIIIB Group metal component(s), an effective quantity of at least one VIB Group metal component(s), and an organic additive, wherein the organic additive is one or more selected from the group consisting of an oxygen-containing or nitrogen-containing organic compound, and the molar ratio of the organic additive to the VIII Group metal component(s) is 0.01-10.

In the context of the present application, the "the molar ratio of the organic additive to the VIII Group metal component(s)" refers to the ratio of the mole number of the organic additive to the mole number, by the metal element, of the VIII Group metal component(s) (in case a multiple of VIII Group metal components present, to the total mole numbers of the metal components).

In one embodiment, the hydrocracking catalyst according to the present invention contains no other components than the acidic silica-alumina, the optional alumina, said at least one VIII Group metal component(s), said at least one VIB Group metal component(s) and the organic additive. That is to say, the hydrocracking catalyst according to one embodiment of the present invention is composed of an acidic silica-alumina, an optional alumina, an effective quantity of at least one VIII Group metal component(s), an effective quantity of at least one VIB Group metal component(s) and an organic additive, wherein the organic additive is one or more selected from the group consisting of an oxygen-containing or nitrogen-containing organic compound, and the molar ratio of the organic additive to the VIII Group metal component(s) is 0.01-10.

In comparison with the art, the hydrocracking catalyst provided according to the present invention has been significantly increased in its conversion activity for aromatic hydrogenation.

For example, under the same reaction condition, when a n-octane solution containing 5.61% tetrahydronaphthalene is used for evaluating a catalyst C-1 provided according to the present invention, the conversion activity for aromatic hydrogenation of the catalyst is 12.3%, while the conversion activity for aromatic hydrogenation is only 9.1% for a reference catalyst RC-1.

The present invention provides further a process for producing the hydrocracking catalyst, wherein the process comprises the step of introducing an effective quantity of at least one VIII Group metal component(s), an effective quantity of at least one VIB Group metal component(s) and an organic additive to an acidic-silica-alumina and an optional alumina, wherein the organic additive is one or more selected from the group consisting of an oxygen-containing or nitrogen-containing organic compound, the organic additive is introduced in such an amount that the molar ratio of the organic additive to the VIII Group metal component(s) is 0.01-10 in the resultant catalyst.

In addition, the present invention relates further to use of the hydrocracking catalyst for hydrocracking hydrocarbon oils. The hydrocarbon oil hydrocracking process comprises the step of contacting a hydrocarbon oil feedstock with the hydrocracking catalyst in the presence of hydrogen under a hydrocracking reaction condition. The aromatic hydrogenation conversion efficiency in the process can be increased significantly by using the hydrocracking catalyst according to the present invention.

For example, when a hydrocracking reaction is carried out in a 150 ml fixed-bed apparatus with a 100 ml inventory of the catalyst, under the reaction conditions of: a temperature of 415° C., a hydrogen partial pressure of 14.0 MPa, a liquid hourly space velocity of 1.0 hr$^{-1}$ and a H/O volume ratio of 900, and when a catalyst C-3 containing an organic additive is used for the hydrocracking, the yield of the <350° C. product oil can be increased by 4 w %, as compared with that using a catalyst RC-2 containing no an organic additive. Meantime, the refraction value of the product oil obtained according to the present invention is lowered, as compared with that from the latter. Since the refraction value is positively proportional to the contents of naphthene and aromatics in the product fraction under a comparable condition, the lower said value is, the higher the conversion activity of the catalyst provided according to the present invention is for hydrocracking.

Specifically, the present invention relates to the following aspects:

1. A hydrocracking catalyst, comprising an acidic silica-alumina, an optional alumina, an effective quantity of at least one VIII Group metal component(s), an effective quantity of at least one VIB Group metal component(s) and an organic additive, wherein the organic additive is one or more selected from the group consisting of an oxygen-containing or nitrogen-containing organic compound, and the molar ratio of the organic additive to the VIII Group metal component(s) is 0.01-10.

2. The hydrocracking catalyst according to aspect 1, characterized in that the catalyst is composed of the acidic silica-alumina, the optional alumina, the effective quantity of said at least one VIII Group metal component(s), the effective quantity of said at least one VIB Group metal component(s) and the organic additive.

3. The hydrocracking catalyst according to aspect 1 or 2, characterized in that the oxygen-containing organic compound is one or more selected from the group consisting of an organic alcohol and an organic acid, the nitrogen-containing organic compound is one or more selected from the group consisting of an organic amine, and the molar ratio of the organic additive to the VIII Group metal component(s) is 0.05-8.

4. The hydrocracking catalyst according to aspect 1 or 2, characterized in that the acidic silica-alumina is one or more selected from the group consisting of silica-alumina and a zeolite molecular sieve.

5. The hydrocracking catalyst according to aspect 4, further comprising alumina, wherein on the basis of the total weight of the acidic silica-alumina and the alumina, the content of the alumina is 20-95 wt %, the content of the acidic silica-alumina is 5-80 wt %.

6. The hydrocracking catalyst according to aspect 1 or 2, characterized in that the alumina comprises an alumina (A) wherein the pore volume of the pore having a diameter of 60-600 angstrom comprises more than 70% of the total pore volume, and an alumina (B) wherein the pore volume of the pore having a diameter of less than 80 angstrom comprises more than 95% of the total pore volume.

7. The hydrocracking catalyst according to aspect 6, characterized in that, on the basis of the weight of the alumina, the content of the alumina (A) is at least 50 wt %, for example from more than 50 wt % to less than 100 wt %, for example from 51 wt % to 90 wt %, for example from 56 wt % to 75 wt %; the content of the alumina (B) is less than 50 wt %, for example from more than 0 wt % to less than 50 wt %, for example from 10 wt % to 49 wt %, for example from 25 wt % to 44 wt %.

8. A process for producing the hydrocracking catalyst according to aspect 1, comprising the step of introducing an effective quantity of at least one VIII Group metal component(s), an effective quantity of at least one VIB Group metal component(s), and an organic additive to an acidic silica-alumina and an optional alumina, wherein the organic additive is one or more selected from the group consisting of an oxygen-containing or nitrogen-containing organic compound, the organic additive is introduced in such an amount that the molar ratio of the organic additive to the VIII Group metal component(s) is 0.01-10 in the resultant catalyst.

9. The process for producing the hydrocracking catalyst according to aspect 8, characterized in that the oxygen-containing organic compound is one or more selected from the group consisting of an organic alcohol and an organic acid, the nitrogen-containing organic compound is one or more selected from the group consisting of an organic amine, and the molar ratio of the organic additive to the VIII Group metal component(s) is 0.05-8.

10. The process for producing the hydrocracking catalyst according to aspect 8, characterized in that the acidic silica-alumina is one or more selected from the group consisting of silica-alumina and a zeolite molecular sieve.

11. The process for producing the hydrocracking catalyst according to aspect 10, characterized in that alumina is further used, wherein on the basis of the total weight of the acidic silica-alumina, which is one or more selected from the group consisting of silica-alumina and a zeolite molecular sieve, and the alumina, the content of the alumina is 20-95 wt %, the content(s) of the silica-alumina and/or the zeolite molecular sieve is 5-80 wt %.

12. The process for producing the hydrocracking catalyst according to aspect 11, characterized in that the alumina comprises an alumina (A) wherein the pore volume of the pore having a diameter of 60-600 angstrom comprises more than 70% of the total pore volume, and an alumina (B) wherein the pore volume of the pore having a diameter of less than 80 angstrom comprises more than 95% of the total pore volume.

13. The process for producing the hydrocracking catalyst according to aspect 12, characterized in that, on the basis of the weight of the alumina, the content of the alumina (A) is at least 50 wt %, for example from more than 50 wt % to less than 100 wt %, for example from 51 wt % to 90 wt %, for example from 56 wt % to 75 wt %; the content of the alumina (B) is less than 50 wt %, for example from more than 0 wt % to less than 50 wt %, for example from 10 wt % to 49 wt %, for example from 25 wt % to 44 wt %.

14. A process for hydrocracking hydrocarbon oils, comprising the step of, in the presence of hydrogen, under a hydrocracking condition, contacting a hydrocarbon oil feedstock with the hydrocracking catalyst according to any one of aforementioned aspects 1-7.

15. The process for hydrocracking hydrocarbon oil according to aspect 14, characterized in that the hydrocracking reaction condition comprises a reaction temperature of 200-650° C., a hydrogen partial pressure of 3-24 MPa, a liquid hourly space velocity of 0.1-10 hrs$^{-1}$, and a H/O volume ratio of 100-5000.

16. The process for hydrocracking hydrocarbon oil according to aspect 15, characterized in that the hydrocracking reaction condition comprises a reaction temperature of 220-510° C., a hydrogen partial pressure of 4-15 MPa, a liquid hourly space velocity of 0.2-5 hrs$^{-1}$, and a H/O volume ratio of 200-1000.

17. The process for hydrocracking hydrocarbon oil according to aspect 14, characterized in that the hydrocarbon oil is selected from a heavy mineral oil, a synthetic oil or a mixed fraction thereof.

18. The process for hydrocracking hydrocarbon oil according to aspect 17, characterized in that the heavy mineral oil is selected from a straight run gas oil, a vacuum gas oil, a demetalized oil, an atmospheric residuum, a deasphalting vacuum residuum, a coking distillate, a catalytic cracking distillate, a shale oil, a coal liquefied oil and a tar sand oil, while the synthetic oil is a Fisch-Tropsch oil.

Additional features of the invention will be set forth in the description which follows, and in part will be apparent from the description, or may be learned by practice of the invention.

THE BEST MODE FOR CARRYING OUT THE INVENTION

The catalyst provided according to the present invention comprises an acidic silica-alumina, an optional alumina, at least one VIII Group metal component(s), at least one VIB Group metal component(s), and an organic additive, and the like. Each constituting component is described as follows.

Said acidic silica-alumina used in the present invention is well known in the art without any special limitation. Specifically, for example, the acidic silica-alumina can be selected from those used generally as a cracking active component in the art, such as one or more selected from silica-alumina, an aluminosilicate and a zeolite molecular sieve, preferably one or more selected from silica-alumina and a zeolite molecular sieve.

With respect to the silica-alumina and the aluminosilicate used as the acidic silica-alumina, it can be selected from those commonly used in the art, or is commercially available, or can be prepared according to a conventional process. Therefore, particular description thereon is omitted hereon.

For the zeolite molecular sieve used as the acidic silica-alumina, there is no special limitation, what can be cited are, for example, a zeolite molecular sieve having a macroporous structure, such as, a zeolite molecular sieve having a faujasite structure, a Beta zeolite structure or a Ω zeolite structure; a zeolite molecular sieve having a mesopore structure, such as a zeolite molecular sieve having a mordenite structure, a ZSM-5 zeolite structure, a ZSM-11 zeolite structure, a ZSM-22 zeolite structure, a ZSM-23 zeolite structure, a ZSM-35 zeolite structure, a ZSM-48 zeolite structure or a ZSM-57 zeolite structure, and the like; or a zeolite molecular sieve having a micropore structure, such as a zeolite molecular sieve having an Erionite zeolite structure or a ZSM-34 zeolite structure. In a preferred embodiment, the zeolite molecular sieve is one or more selected from the group consisting of a zeolite molecular sieve having a faujasite structure, a zeolite molecular sieve having a Beta zeolite structure, a zeolite molecular sieve having a ZSM-5 zeolite structure and a zeolite molecular sieve having a mordenite structure. For the zeolite molecular sieve having a faujasite structure, more preferred is a Y-zeolite molecular sieve. Said Y-zeolite molecular sieve is more preferably one or more selected from the group consisting of a HY-zeolite molecular sieve, a rare earth type Y-zeolite (REY) molecular sieve, a rare earth type HY-zeolite (REHY) molecular sieve, a superstable Y-zeolite (USY) molecular sieve, a rare-earth type superstable Y-zeolite (REUSY) molecular sieve, a phosphor-containing Y-zeolite molecular sieve, a phosphor-containing Y-superstable zeolite molecular sieve, a phosphor-containing HY-zeolite molecular sieve and a dealuminized Y-zeolite molecular sieve.

These zeolite molecular sieves are commercially available or can be prepared according to a conventional process. This is well known to one skilled in the art.

In order to improve further the performances of the catalyst according to the present invention, as previously described, the catalyst can contain further alumina.

As the alumina, it can be one or more selected from alumina commonly used as a catalyst matrix in the art. Said alumina is commercially available, or can be prepared according to a conventional process.

In a preferred embodiment, the alumina comprises at least an alumina wherein the pore volume of the pore having a diameter of 60-600 angstrom comprises more than 70% of the total pore volume. For the purpose of distinction, this kind of alumina is called as alumina (A) hereinafter. More preferred is that, on the basis of the weight of the alumina, the content of the alumina (A) is at least 50 wt % of the alumina, for example from more than 50 wt % to less than 100 wt %, for example from 51 wt % to 90 wt %, for example from 56 wt % to 75 wt %.

Said alumina (A) is commercially available, or can be prepared according to a conventional process. For example, the alumina (A) can be one having a X-ray diffraction pattern corresponding to one or more selected from the group consisting of γ-alumina, η-alumina, θ-alumina, δ-alumina and χ-alumina, or an alumina hydrate that can provide the aforementioned structure(s). Further, the alumina hydrate is one or more selected from the group consisting of alumina trihydrate, alumina monohydrate and an amorphous aluminum hydroxide. Alternatively, the alumina hydrate is one or more selected from the group consisting of alumina trihydrate, alumina monohydrate and an amorphous aluminum hydroxide, which contains one or more element(s) selected from silicon, titanium, magnesium, boron, zirconium, thorium, niobium and rare earth. The alumina and the alumina hydrate can be prepared by any well-known process, for example, by a precipitation or decomposition etc., from an aluminum-containing salt solution or an organic aluminum and the like.

In a preferred embodiment, the alumina further comprises at least an alumina wherein the pore volume of the pore having a diameter of less than 80 angstrom comprises more than 95% of the total pore volume. For the purpose of distinction, this kind of alumina is called as alumina (B) hereinafter. More preferred is that, on the basis of the weight of the alumina, the content of the alumina (B) is less than 50 wt % of the alumina, for example from more than 0 wt % to less than 50 wt %, for example from 10 wt % to 49 wt %, for example from 25 wt % to 44 wt %.

Said alumina (B) is commercially available, or can be prepared according to a conventional process. For example, the alumina (B) can be one having a X-ray diffraction pattern corresponding to one or more selected from the group consisting of γ-alumina, η-alumina, θ-alumina, δ-alumina and χ-alumina, or an alumina hydrate that can provide the aforementioned structure(s). Further, the alumina hydrate is one or more selected from the group consisting of alumina trihydrate, alumina monohydrate and an amorphous aluminum hydroxide. Alternatively, the alumina hydrate is one or more selected from the group consisting of alumina trihydrate, alumina monohydrate and an amorphous aluminum hydroxide, which contains one or more element(s) selected from silicon, titanium, magnesium, boron, zirconium, thorium, niobium and rare earth. The alumina and the alumina hydrate can be prepared by any well-known process, for example, by a precipitation or decomposition etc., from an aluminum-containing salt solution or an organic aluminum and the like.

When the catalyst according to the present invention comprises the alumina as a further component, there is no special limitation on the ratio of the acidic silica-alumina to the alumina, any suitable ratio can be used. In a preferred embodiment, on the basis of the total weight of the acidic silica-alumina, which is one or more selected from the group consisting of silica-alumina, an aluminosilicate and a zeolite molecular sieve, and the alumina, the content of the alumina is 20-95 wt % and the content of the acidic silica-alumina is 5-80 wt %. In a more preferred embodiment, on the basis of the total weight of the acidic silica-alumina, which is selected from silica-alumina and/or a zeolite molecular sieve, and the alumina, the content of the alumina is 20-95 wt %, the content of the acidic silica-alumina is 5-80 wt %.

The VIII Group metal component(s) and VIB Group metal component(s), which are used as the metal components of the catalyst according to the present invention, can be selected from those generally used in the art. However, preferred are that the VIII Group metal component(s) is/are selected from cobalt and/or nickel, and the VIB Group metal component(s) is/are selected from molybdenum and/or tungsten. There are no special limitations on the specified contents of these metal components used, as long as they effectively show a catalytic activity by the content, i.e. an "effective quantity". This is obvious to one skilled in the art.

In preferred embodiments, on the basis of the weight of the catalyst, the content(s) by oxide of the VIII Group metal component(s) in the catalyst according to the present invention is/are preferably 1-10 wt %, more preferably 2-8 wt %, the content(s) by oxide of the VIB Group metal component(s) is/are preferably 5-40 wt %, more preferably 10-35 wt %.

As described previously, an organic additive is used as a further component. Said organic additive can be one or more selected from the group consisting of an oxygen-containing or nitrogen-containing organic compound. With respect to the oxygen-containing organic compound, what can be cited is one or more selected from the group consisting of an organic alcohol and an organic acid; for the nitrogen-containing organic compound, what can be cited is one or more selected from the group consisting of an organic amine. As an example, the oxygen-containing organic compound can be one or more selected from the group consisting of ethylene glycol, glycerol, polyethylene glycol (with a molecular weight of 200-1500), acetic acid, maleic acid, oxalic acid, aminotriacetic acid, 1,2-cycohexanediaminetetraacetic acid and citric acid. For the nitrogen-containing organic compound, ethylene diamine or EDTA can be given as an example.

There is no special limitation on the content of the organic additive in the catalyst according to the present invention, as long as by the content, the organic additive effectively shows an activity. In preferred embodiments, it is stipulated that the molar ratio of the organic additive, which is one or more selected from the group consisting of an oxygen-containing or nitrogen-containing organic compound, to the VIII Group metal component(s) is 0.05-8.

In an embodiment, the present invention provides further a process for producing the hydrocracking catalyst.

The process for producing the catalyst according to the present invention is completed by introducing a given amount of the addition components (comprising said at least one VIII Group metal component(s), said at least one VIB Group metal component(s) and the organic additive and the like) to the acidic silica-alumina and the optional alumina. For instance, what can be cited is a process wherein a solution comprising the organic additive, said at least one VIII Group metal compound(s) and said at least one VIB Group metal compound(s) is obtained by formulating and mixing, then contacts the solution with the acidic silica-alumina and the optional alumina; or wherein a solution comprising said at least one VIII Group metal compound(s) and said at least one VIB Group metal compound(s) and a solution comprising the organic additive are respectively formulated, then contacts the solutions with the acidic silica-alumina and the optional alumina, and the like. Said contacting can be realized by any process, for example, an impregnation process can be cited. There is no special limitation on the impregnation process, a conventional process can be used. According to the present invention, a catalyst having a required amount of the addition components as stipulated by the present invention can be prepared by adjusting the concentration(s) and amount(s) of the addition component solution(s) to be used, or the amount(s) of the acidic silica-alumina and the optional alumina to be used. This is obvious to one skilled in the art.

In an embodiment, the catalyst according to the present invention is prepared by introducing simultaneously the organic additive and the VIII Group metal component(s) and the VIB Group metal component(s) to the acidic silica-alumina and the optional alumina. Further, in a preferred embodiment, a step of drying the obtained catalyst is involved. In another embodiment, the catalyst according to the present invention is prepared by introducing respectively the organic additive, the VIII Group metal component(s) and the VIB Group metal component(s) to the acidic silica-alumina and the optional alumina. As a preferred embodiment, a solution containing said at least one VIII Group metal compound(s) and said at least one VIB Group metal compound(s) firstly contacts the acidic silica-alumina and the optional alumina, then is dried, subsequently subjected to a calcination, or without a calcination, after contacts with a solution containing the organic additive, the resultant catalyst is finally dried. Said contacting can be realized by any process, for instance, an impregnation process can be cited. There is no special limitation on the impregnation process, a conventional process can be used. The conditions for drying and calcining are those used commonly for producing this type of catalyst in the art, without any special limitation, however, what can be cited are that the drying temperature is 80-350° C., preferably 100-300° C., the drying time is 1-24 hrs, preferably 2-12 hrs, the calcining temperature is 350-550° C., preferably 400-500° C., and the calcining time is 1-10 hrs, preferably 2-8 hrs.

According to the present invention, it is stipulated that the organic additive is introduced in such an amount that the molar ratio of the organic additive to the VIII Group metal component(s) is 0.05-8 in the resultant catalyst.

As far as the process for producing the catalyst according to the present invention is concerned, by the expression "introducing . . . to the acidic silica-alumina and the optional alumina", it means "introducing . . . to the acidic silica-alumina "(when the alumina is not used as a further component of the catalyst according to the present invention) or" introducing . . . to the acidic silica-alumina and the alumina" (when the alumina is used as a further component of the catalyst according to the present invention). This is obvious to one skilled in the art. In the later case, the acidic silica-alumina and the alumina can be used individually, or in a mixture, which can be obtained by a conventional process.

During preparation of the catalyst according to the present, there are no special limitations on the VIII Group metal compound(s) and VIB Group metal compound(s) used, as long as they can provide the metal components as required by the present invention, i.e. any of those well-known in the art can be used. Specifically, the VIII Group metal compound(s) can be one or more selected from the group consisting of the soluble compounds of the corresponding metal(s), for example, what can be cited is one or more selected from the group consisting of a nitrate, an acetate, a carbonate, a chloride and a soluble complex of the metal(s). Said VIB Group metal compound(s) can be one or more selected from the group consisting of the soluble compounds of the corresponding metal(s), for example, what can be cited is one or more selected from the group consisting of a molybdate, a paramolybdate, a tungstate, a metatungstate and an ethyl metatungstate.

Furthermore, in the preparation of the catalyst according to the present invention, the solvent used for formulating aforesaid various solutions is freely selectable to one skilled in the art without any special limitation. Therefore, specified description thereon is omitted in this application.

Other items such as equipments used for producing the catalyst according to the present invention are also widely known in the art, therefore, detailed description thereon is not necessary herein.

Moreover, in addition to the addition components as mentioned above, as needed, the catalyst according to the present invention may further contain other components commonly known in the art, such as F, P and B and the like.

Further, the contents of the metal components (comprising said at least one VIII Group metal component(s), said at least one VIB Group metal component(s)) in the catalyst according to the present invention can be measured by a conventional process used in the art, for example, what can be cited is a X-ray fluorescence spectrometry and the like. The content of other components, for example that of the carrier or the organic additive, can be calculated from the actual inventory.

After the catalyst provided according to the present invention is prepared, it is preferably molded into various moldings for ease of handling, as needed, or for various purposes, such as a microsphere, a sphere, a tablet or a strip and the like. Moulding can be carried out by a conventional process, such as pelleting, balling, extruding and the like.

According to the practice in the art, the catalyst provided according to the present invention is generally pre-sulfurized in the presence of hydrogen at a temperature of 140-370° C. with sulfur, hydrogen sulfide or a sulfur-containing feedstock, before use. The presulfurization can be carried out outside the reactor, or in-situ inside the reactor, so as to convert the catalyst into a sulfide form.

In a further embodiment, the present invention relates to use of the hydrocracking catalyst for hydrocracking hydrocarbon oils. That is, the present invention provides a process for hydrocracking hydrocarbon oils that comprises the step of contacting a hydrocarbon oil feedstock with the hydrocracking catalyst according to the present invention in the presence of hydrogen under a hydrocracking reaction condition.

In the process for hydrocracking hydrocarbon oils provided according to the present invention, there is no special limitation on the hydrocracking reaction condition, any commonly used in the art can be used. As an example, there is a reaction condition of a reaction temperature of 200-650° C., preferably 300-510° C., a reaction pressure of 3-24 MPa, preferably 4-15 MPa, a liquid hourly space velocity of 0.1-10 $hrs^{-1}$, preferably 0.2-5 $hrs^{-1}$, and a H/Oil volume ratio of 100-5000, preferably 200-1000.

With the hydrocracking process provided according to the present invention, various hydrocarbon oil feedstocks can be processed directly for hydrocracking, so as to obtain a hydrocarbon fraction with a lowered boiling point and a lowered molecular weight, or a hydrocracking tail oil with a lowered aromatic contents. The hydrocarbon oil feedstock can be selected from the group consisting of a heavy mineral oil, a synthetic oil, or a mixed fraction thereof. In preferred embodiments, the heavy mineral oil is selected from the group consisting of a straight run gas oil, a vacuum gas oil, a demetalized oil, an atmospheric residuum, a deasphalting vacuum residuum, a coking distillate, a catalytic cracking distillate oil, a shale oil, a coal liquefied oil, a tar sand oil and the like. Said synthetic oil is a Fisch-Tropsch oil.

The catalyst provided according to the present invention is suitable for hydrocracking heavy and poor distillates, especially for producing a fraction with a distillation range of <350° C. and a fraction with a distillation range of higher than 350° C. Further it is specially suitable for dominantly producing a fraction with a distillation range of less than 350° C., and/or for efficiently decreasing the aromatic and naphthene contents in a feedstock.

The following Examples are provided as illustration of the present invention rather than limitation thereon.

The contents of the metal components in Examples are measured by a X-ray fluorescence spectrometry.

All reagents used in Examples are in chemical pure, unless otherwise specified.

EXAMPLES

Example 1

80 g PSRY zeolite (trade name: PSRY, provided by the Chang Ling Catalyst Plant, with a lattice constant of 24.50-24.60 Å, and a phosphor content of 0.5-2.0) was mixed with 920 g (hereinafter, on a dry basis) pseudo-boehmite (trade name: SD powder, provided by the Shan Dong Aluminum Plant, wherein the pore volume of the pore having a diameter less than 80 angstrom comprises more than 95% of the total pore volume) and 30 g sesbania powder, then was extruded into a trefoil strand having a circumcircle diameter of 1.6 mm, baked to dry at 120° C. and calcined at a temperature of 600° C. for 3 hrs, to obtain a catalyst carrier, named as carrier CS-1, the composition of which was shown in Table 1. 100 g of the carrier CS-1 was impregnated with 70 ml ammoniated aqueous solution containing 6.76 g ammonium paramolybdate (provided by the Zhu Zhou Hard Alloy Factory, with a molybdenum oxide content of 80 wt %), 22 g cobalt nitrate (provided by the Beijing Chemical Plant, with a cobalt oxide content of 24.5 wt %) and 1.05 g EDTA, then treated at 220° C. for 1 hr, to obtain a catalyst, named as catalyst C-1, the composition of which was shown in Table 2.

Comparative Example 1

100 g of the carrier CS-1 was impregnated with 70 ml ammoniated aqueous solution containing 6.76 g ammonium paramolybdate (provided by the Zu Zhou Hard Alloy Factory, with a molybdenum oxide content of 80 wt %), 22 g cobalt nitrate (provided by the Beijing Chemical Plant, with a cobalt oxide content of 24.5 wt %), then baked to dry at 120° C. and calcined at 480° C. for 4 hrs, to obtain a catalyst, named as catalyst RC-1, the composition of which was shown in Table 2.

Example 2

800 g SiAl powder (trade name: Siral-40, provided by SASOL of Germany) was extruded with 200 g pseudo-boehmite (trade name: SD powder, provided by the Shang Dong Aluminum Plant, wherein the pore volume of the pore having a diameter of less than 80 angstrom comprises more than 95% of the total pore volume) into a cylindrical strand with a circumcircle diameter of 1.2 mm, baked to dry at 120° C., and calcined at a temperature of 500° C. for 3 hrs, to obtain a catalyst carrier, named as carrier CS-2, the composition of which was shown in Table 1. After cooled to the room temperature, 100 g of the CS-2 carrier was impregnated with 85 ml aqueous solution containing 38.25 g ammonium metatungstate (provided by the Sichuan Zi Gong Hard Alloy Factory, with a tungsten oxide content of 82 wt %) and 24.37 g nickel nitrate (provided by the Beijing Yi Li Fine Chemicals Corporation, with a nickel oxide content of 25.4 wt %), treated at 180° C. for 4 hrs, after cooled to the room temperature, impregnated with 39.04 g ethylene glycol, treated at 105° C. for 10 hrs, to obtain a catalyst, named as catalyst C-2, the composition of which was shown in Table 2.

Example 3

300 g SiAl powder (trade name: Siral-40, provided by SASOL of Germany) was extruded with 300 g aluminum hydroxide powder (trade name: CL dry gel powder, provided by the Chang Ling Catalyst Plant, wherein the pore volume of the pore having a diameter of 60-600 angstrom comprises more than 70% of the total pore volume) into a cylindrical strand with a circumcircle diameter of 1.2 mm, baked to dry at 120° C., and calcined at a temperature of 500° C. for 3 hrs, to obtain a carrier, named as carrier CS-3, the composition of which was shown in Table 1. After cooled to the room temperature, 100 g of CS-3 carrier was impregnated with 85 ml aqueous solution containing 38.25 g ammonium metatungstate (provided by the Sichuan Zi Gong Hard Alloy Factory, with a tungsten oxide content of 82 wt %) and 24.37 g nickel nitrate (provided by the Beijing Yi Li Fine Chemicals Corporation, with a nickel oxide content of 25.4 wt %), treated at 180° C. for 4 hrs, after cooled to the room temperature, impregnated with 39.04 g ethylene glycol, treated at 105° C. for 10 hrs, to obtain a catalyst, named as catalyst C-3, the composition of which was shown in Table 2.

Comparative Example 2

This comparative example illustrates preparation of a reference catalyst.

The comparative catalyst RC-2 was prepared similarily as in Example 3, except that after supported with NiW, the catalyst obtained was not impregnated with ethylene glycol.

Example 4

800 g SiAl powder (trade name: Siral-40, provided by SASOL of Germany) was extruded with 200 g aluminum hydroxide powder (trade name: CL dry gel powder, provided by the Chang Ling Catalyst Plant, wherein the pore volume of the pore having a diameter of 60-600 angstrom comprises more than 70% of the total pore volume), 100 g pseudo-boehmite (trade name: SD powder, provided by the Shan Dong Aluminum Plant, wherein the pore volume of the pore having a diameter less than 80 angstrom comprises more than 95% of the total pore volume) and 300 g ultrastable Y-type zeolite molecular sieve (trade name: LAY, provided by the Chang Ling Catalyst Plant, with a lattice constant of 24.55 Å) into a butterfly type strand with a circumcircle diameter of 1.5 mm, baked to dry at 120° C., and calcined at a temperature of 550° C. for 3 hrs, to obtain a carrier, named as carrier CS-4, the composition of which was shown in Table 1. After cooled to the room temperature, 100 g of the CS-4 carrier was impregnated with 70 ml aqueous solution containing 1.78 g ethylene diamine, treated at 80° C. for 24 hrs, then impregnated further with 70 ml aqueous solution containing 54.84 g ammonium metatungstate (provided by the Sichuan Zi Gong Hard Alloy Factory, with a tungsten oxide content of 82 wt %) and 17.35 g nickel nitrate (provided by the Beijing Yi Li Fine Chemicals Corporation, with a nickel oxide content of 25.4 wt %), treated at 100° C. for 4 hrs, then cooled to the room temperature, to obtain a catalyst, named as catalyst C-4, the composition of which was shown in Table 2.

Example 5

450 g aluminum hydroxide powder (trade name: CL dry gel powder, provided by the Chang Ling Catalyst Plant, wherein the pore volume of the pore having a diameter of 60-600 angstrom comprises more than 70% of the total pore volume) was extruded with 350 g pseudo-boehmite (trade name: SD powder, provided by the Shang Dong Aluminum Plant, wherein the pore volume of the pore having a diameter less than 80 angstrom comprises more than 95% of the total pore volume) and 100 g ZSM-5 zeolite molecular sieve (provided by the Chang Ling Jian Chang Catalyst Plant, with a silica-alumina ratio of 50) and 100 g Beta zeolite molecular sieve (provided by the Chang Ling Jian Chang Catalyst Plant, with a silica-alumina ratio of 27) into a butterfly type strand with a circumcircle diameter of 3.6 mm, baked to dry at 120° C., and calcined at a temperature of 550° C. for 3 hrs, to obtain a carrier, named as carrier CS-5, the composition of which was shown in Table 1. After cooled to the room temperature, 100 g of the CS-5 carrier was impregnated with 80 ml aqueous solution containing 9.25 g ammonium paramolybdate (provided by the Zhu Zhou Hard Alloy Factory, with a molybdenum oxide content of 80 wt %), 43.84 g ammonium metatungstate (provided by the Sichuan Zi Gong Hard Alloy Factory, with a tungsten oxide content of 82 wt %) and 18.05 g nickel nitrate (provided by the Beijing Yi Li Fine Chemicals Corporation, with a nickel oxide content of 25.4 wt %), dried at 120° C. and calcined at 450° C. for 3 hrs. After cooled to the room temperature, the resultant product was impregnated with 50 ml aqueous solution containing 26.41 g citric acid, then dried at 120° C. for 4 hrs, to obtain a catalyst, named as catalyst C-5, the composition of which was shown in Table 2.

Example 6

80 g PSRY zeolite (trade name: PSRY, provided by the Chang Ling Catalyst Plant, with a lattice constant of 24.50-24.60 Å, and a phosphor content of 0.5-2.0) was mixed with 450 g (hereinafter, on a dry basis) pseudo-boehmite (trade name: SD powder, provided by the Shan Dong Aluminum Plant, wherein the pore volume of the pore having a diameter less than 80 angstrom comprises more than 95% of the total pore volume), 470 g aluminum hydroxide powder (trade name: CL dry gel powder, provided by the Chang Ling Catalyst Plant, wherein the pore volume of the pore having a diameter of 60-600 angstrom comprises more than 70% of the total pore volume) and 30 g sesbania powder, then was extruded into a trefoil strand having a circumcircle diameter of 1.6 mm, baked to dry at 120° C. and calcined at a temperature of 600° C. for 3 hrs, to obtain a catalyst carrier, named as carrier CS-6, the composition of which was shown in Table 1. 100 g of the carrier CS-6 was impregnated with 70 ml ammoniated aqueous solution containing 6.76 g ammonium paramolybdate (provided by the Zhu Zhou Hard Alloy Factory, with a molybdenum oxide content of 80 wt %), 22 g cobalt nitrate (provided by the Beijing Chemical Plant, with a cobalt oxide content of 24.5 wt %) and 1.05 g EDTA, then treated at 220° C. for 1 hr, to obtain a catalyst, named as catalyst C-6, the composition of which was shown in Table 2.

Example 7

300 g SiAl powder (trade name: Siral-40, provided by SASOL of Germany) was extruded with 30 g (hereinafter, on a dry basis) pseudo-boehmite (trade name: SD powder, provided by the Shan Dong Aluminum Plant, wherein the pore volume of the pore having a diameter less than 80 angstrom comprises more than 95% of the total pore volume), 270 g aluminum hydroxide powder (trade name: CL dry gel powder, provided by the Chang Ling Catalyst Plant, wherein the pore volume of the pore having a diameter of 60-600 angstrom comprises more than 70% of the total pore volume) into a cylindrical strand with a circumcircle diameter of 1.2 mm, baked to dry at 120° C., and calcined at a temperature of 500° C. for 3 hrs, to obtain a carrier, named as carrier CS-7, the composition of which was shown in Table 1. After cooled to the room temperature, 100 g of the CS-7 carrier was impregnated with 85 ml aqueous solution containing 38.25 g ammonium metatungstate (provided by the Sichuan Zi Gong Hard Alloy Factory, with a tungsten oxide content of 82 wt %) and 24.37 g nickel nitrate (provided by the Beijing Yi Li Fine Chemicals Corporation, with a nickel oxide content of 25.4 wt %) and treated at 180° C. for 4 hrs. After being cooled to the room temperature, the resultant product was impregnated with 39.04 g ethylene glycol and treated at 105° C. for 10 hrs, to obtain a catalyst, named as catalyst C-7, the composition of which was shown in Table 2.

TABLE 1

| Carrier Example No. | Alumina, wt % | | Acidic silica-alumina, wt % | |
|---|---|---|---|---|
| | SD powder | CL powder | SiAl powder | Zeolite |
| 1 CS-1 | 92 | | | 8 |
| 2 CS-2 | 20 | | 80 | |
| 3 CS-3 | | 20 | 80 | |
| 4 CS-4 | 10 | 30 | 30 | 30 |
| 5 CS-5 | 35 | 45 | | 20 |
| 6 CS-6 | 45 | 47 | | 8 |
| 7 CS-7 | 2 | 18 | 80 | |

TABLE 2

| Example | Catalyst No. | VIII Group metal component, wt % | | VIB Group metal component, wt % | | Organic additive, mol/mol* |
|---|---|---|---|---|---|---|
| | | NiO | CoO | WO$_3$ | MoO$_3$ | |
| 1 | C-1 | | 4.4 | | 14.2 | 0.05 |
| Comparative Example 1 | RC-1 | | 4.4 | | 14.2 | |
| 2 | C-2 | 4.5 | | 22.8 | | 7.6 |
| 3 | C-3 | 4.5 | | 22.8 | | 7.6 |
| Comparative Example 2 | RC-2 | 4.5 | | 22.8 | | |
| 4 | C-4 | 2.95 | | 30.1 | | 0.5 |
| 5 | C-5 | 3.1 | | 24.3 | 5 | 2.2 |
| 6 | C-6 | | 4.4 | | 14.2 | 0.05 |
| 7 | C-7 | 4.5 | | 22.8 | | 7.6 |

*The molar ratio, mol/mol, refers to the molar ratio of the organic additive to the VIII Group metal component in the catalyst.

Examples 6-10

These Examples illustrate the catalytic performances of the catalysts C1-C5 provided according to the present invention.

The respective hydrocracking activity of the catalysts C1-C5 was evaluated in a 2 ml hydrocracking apparatus with a catalyst inventory of 0.2 ml, a catalyst particle diameter of 0.3-0.45 mm, a reaction temperature of 390° C., a reaction pressure of 4.0 MPa, a hydrogen/oil ratio (molar ratio) of 25, and a liquid hourly space velocity of 30 hrs$^{-1}$. Further, to evaluate the micro-reaction, a n-octane solution containing 5.61% tetrahydronaphthalene was used. Before contacting with the oil feedstock, the catalyst used was previously sulphurized by being impregnated with a n-hexane solution containing 6% CS$_2$ at a hydrogen pressure of 2.0 MPa and a reaction temperature of 60° C., then heated to a temperature of 300° C., then held at the same temperature for 4 hrs.

The aromatic hydrogenation activity of the catalyst is defined by the equation as follows:

Aromatic hydrogenation activity=(100−(the total amount of tetrahydronaphthalene in the product+ the total amount of naphthalene in the product)/ the total amount of tetrahydronaphthalene in the feedstock)*100.

The results obtained were shown in Table 3.

Comparative Example 2

The evaluation on the catalyst RC-1 was carried out by using the same process as that of Example 6. The results obtained were shown in Table 3.

TABLE 3

| Example | Catalyst | Aromatic hydrogenation activity |
| --- | --- | --- |
| Comparative Example 2 | RC-1 | 9.1 |
| 6 | C-1 | 12.3 |
| 7 | C-2 | 11.1 |
| 8 | C-3 | 13.5 |
| 9 | C-4 | 75.3 |
| 10 | C-5 | 62.4 |

From Table 3, it can be seen that, for the catalyst C-1 in which an organic additive was added, the aromatic hydrogenation activity is increased significantly by 3.2%, as compared with that of the catalyst RC-1 without an additive added; for the catalyst C-3 in which a macropore alumina (wherein the pore volume of the pore having a diameter of 60-600 angstrom comprises more than 70% of the total pore volume) was additionally used for producing the catalyst, the aromatic hydrogenation activity is increased further by 2.4%, as compared with that of the catalyst C-2 in which only a micropore alumina (wherein the pore volume of the pore having a diameter less than 80 angstrom comprises more than 95% of the total pore volume) was used.

Example 11

This example illustrates the hydrocracking process provided according to the present invention.

The reaction was carried out with a feedstock oil shown in Table 4 in a 150 ml fixed-bed apparatus with a catalyst inventory of 100 ml, under the reaction conditions: a reaction temperature of 415° C., a hydrogen partial pressure of 14.0 MPa, a liquid hourly space velocity of $1.0^{-1}$ and a H/Oil volume ratio of 900, by using the catalyst C-3 as the catalyst, the results of which were shown in Table 5.

Comparative Example 3

This Example illustrates the hydrocracking process provided according to the prior art.

The reaction was carried out with a feedstock oil shown in Table 4 in a 150 ml fixed-bed apparatus with a catalyst inventory of 100 ml, under the reaction conditions: a reaction temperature of 415° C., a hydrogen partial pressure of 14.0 MPa, a liquid hourly space velocity of 1.0 $hrs^{-1}$ and a H/Oil volume ratio of 900, by using the catalyst RC-2 as the catalyst, the results of which were shown in Table 5.

TABLE 4

| | |
| --- | --- |
| Density (20° C.)(g/cm$^3$) | 0.9029 |
| S, Wt % | 2.44 |
| N, mg/L | 1000 |
| Simulating distillation (ASTM D-2887) | |
| IBP | 236 |
| 50 | 438 |
| FBP | 556 |

TABLE 5

| Product oil properties | Example 11 | Comparative Example 3 |
| --- | --- | --- |
| Catalyst | C3 | RC-2 |
| Refraction (70° C.) | 1.4441 | 1.4480 |
| Yield of <350° C. fraction in the product oil | 45.8 | 41.8 |

From the results given in Table 5, it can be seen that under the same reaction conditions, in the hydrocracking process using the catalyst C-3 containing an organic additive, the yield of the <350° C. fraction oil is increased by 4 w %, and the refraction value of the product oil is lowered, as compared with the comparative example that uses RC-2 catalyst containing no an organic additive for the hydrocracking. Since the refraction value is positively proportional to the contents of naphthene and aromatics in the product fraction under a comparable condition, the lower said value is, the higher the conversion activity of the catalyst provided according to the present invention is for hydrocracking.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A hydrocracking catalyst, comprising a carrier, an effective quantity of at least one VIII Group metal component(s), an effective quantity of at least one VIB Group metal component(s), and an organic additive,
   wherein the organic additive is one or more selected from the group consisting of oxygen-containing compounds and nitrogen-containing organic compounds, and a molar ratio of the organic additive to the VIII Group metal component(s) is 0.01-10,
   wherein the alumina carrier comprises an acidic silica-alumina, alumina (A), and alumina (B),
   wherein a weight percentage of alumina (A) is 51-90 wt % and a weight percentage of alumina (B) is 10-49 wt % based on a total weight of alumina (A) and alumina (B), and
   wherein alumina (A) has a pore volume of pores having a diameter in the range of 60-600 angstrom being more than 70% of the total pore volume of alumina (A), and alumina (B) has a pore volume of pores having a diameter of less than 80 angstrom being more than 95% of the total pore volume of alumina (B).

2. The hydrocracking catalyst according to claim 1, characterized in that the catalyst is composed of the carrier, the effective quantity of said at least one VIII Group metal component(s), the effective quantity of said at least one VIB Group metal component(s), and the organic additive.

3. The hydrocracking catalyst according to claim 1, characterized in that the oxygen-containing organic compound is one or more selected from the group consisting of an organic alcohol and an organic acid, the nitrogen-containing organic compound is an organic amine, and the molar ratio of the organic additive to the VIII Group metal component(s) is 0.05-8.

4. The hydrocracking catalyst according to claim 1, characterized in that the acidic silica-alumina is one or more selected from the group consisting of silica-alumina and a zeolite molecular sieve.

5. The hydrocracking catalyst according to claim 1, wherein a weight percentage of the acidic silica-alumina is 5-80 wt % based on a weight of the carrier.

6. The hydrocracking catalyst according to claim 1, wherein the weight percentage of alumina (A) is 56-75 wt % and the weight percentage of alumina (B) is 24-44 wt %.

7. The hydrocracking catalyst according to claim 1, characterized in that the oxygen-containing compound is an organic acid.

8. The hydrocracking catalyst according to claim 1, characterized in that the organic additive is one or more selected from ethylenediaminetetraacetic acid, citric acid, acetic acid, maltic acid, and oxatic acid.

9. A process for producing a hydrocracking catalyst, comprising the step of:
preparing a carrier comprising an acidic silica-alumina, alumina (A), and alumina (B);
introducing an effective quantity of at least one VIII Group metal component(s), an effective quantity of at least one VIB Group metal component(s), and an organic additive to said carrier,
wherein the organic additive is one or more selected from the group consisting of oxygen-containing compounds and nitrogen-containing organic compounds, the organic additive is introduced in such an amount that a molar ratio of the organic additive to the VIII Group metal component(s) is 0.01-10 in the resultant catalyst, and
wherein a weight percentage of alumina (A) is 51-90 wt % and a weight percentage of alumina (B) is 10-49 wt % based on a total weight of alumina (A) and alumina (B),
wherein in alumina (A) a pore volume of pores having a diameter of 60-600 angstrom is more than 70% of the total pore volume of alumina (A), and in alumina (B) a pore volume of pores having a diameter of less than 80 angstrom more than 95% of the total pore volume of alumina (B).

10. The process for producing the hydrocracking catalyst according to claim 9, characterized in that the oxygen-containing organic compound is one or more selected from the group consisting of an organic alcohol and an organic acid, the nitrogen containing organic compound is an organic amine, and the molar ratio of the organic additive to the VIII Group metal component(s) is 0.05-8.

11. The process for producing the hydrocracking catalyst according to claim 9, characterized in that the acidic silica-alumina is one or more selected from the group consisting of silica-alumina and a zeolite molecular sieve.

12. The process for producing the hydrocracking catalyst according to claim 11, wherein a weight percentage of the acidic silica-alumina is 20-95 wt % based on a weight of the carrier.

13. The process for producing the hydrocracking catalyst according to claim 9, wherein the weight percentage of alumina (A) is 56-75 wt % and the weight percentage of alumina (B) is 24-44 wt %.

14. A process for hydrocracking hydrocarbon oils, comprising the step of contacting a hydrocarbon oil feedstock with the hydrocracking catalyst of claim 1 in the presence of hydrogen under a hydrocracking condition.

15. The process for hydrocracking hydrocarbon oil according to claim 14, characterized in that the hydrocracking reaction condition comprises a reaction temperature of 200-650° C., a hydrogen partial pressure of 3-24 MPa, a liquid hourly space velocity of 0.1-10 hrs$^{-1}$, and a H/Oil volume ratio of 100-5000.

16. The process for hydrocracking hydrocarbon oil according to claim 15, characterized in that the hydrocracking reaction condition comprises a reaction temperature of 220-510° C., a hydrogen partial pressure of 4-15 MPa, a liquid hourly space velocity of 0.2-5 hrs$^{-1}$, and a H/Oil volume ratio of 200-1000.

17. The process for hydrocracking hydrocarbon oil according to claim 14, characterized in that the hydrocarbon oil is selected from a heavy mineral oil, a synthetic oil, or a mixed fraction thereof.

18. The process for hydrocracking hydrocarbon oil according to claim 17, characterized in that the heavy mineral oil is selected from a straight run gas oil, a vacuum gas oil, a demetalized oil, an atmospheric residuum, a deasphalting vacuum residuum, a coking distillate, a catalytic cracking distillate, a shale oil, a coal liquefied oil, and a tar sand oil, wherein the synthetic oil is a Fisch-Tropsch oil.

* * * * *